(12) United States Patent
Cartwright et al.

(10) Patent No.: US 6,952,979 B2
(45) Date of Patent: Oct. 11, 2005

(54) STEERING COLUMN

(75) Inventors: Mark A. Cartwright, W. Lafayette, IN (US); Greg B. Livengood, Greenfield, IN (US)

(73) Assignee: TRW Inc., Lyndhurst, OH (US)

(*) Notice: Subject to any disclaimer, the term of this patent is extended or adjusted under 35 U.S.C. 154(b) by 0 days.

(21) Appl. No.: 10/244,969

(22) Filed: Sep. 17, 2002

(65) Prior Publication Data

US 2004/0050201 A1 Mar. 18, 2004

(51) Int. Cl.[7] ................................................ B62D 1/18
(52) U.S. Cl. ........................ 74/493; 74/495; 280/775
(58) Field of Search ............................ 74/493, 494, 495; 280/775; 384/64, 614, 623

(56) References Cited

U.S. PATENT DOCUMENTS

| | | | | |
|---|---|---|---|---|
| 1,135,044 A | * | 4/1915 | Olsson ....................... | 384/614 |
| 4,449,419 A | | 5/1984 | Soler Bruguera | |
| 4,507,982 A | | 4/1985 | Turner et al. .................. | 74/493 |
| 4,541,298 A | | 9/1985 | Strutt | |
| 4,656,888 A | * | 4/1987 | Schmitz ....................... | 74/493 |
| 5,088,767 A | * | 2/1992 | Hoblingre et al. .......... | 280/775 |
| 5,131,287 A | | 7/1992 | Stromberg | |
| 5,213,004 A | | 5/1993 | Hoblingre | |
| 5,259,264 A | * | 11/1993 | Bodin et al. .................. | 74/493 |
| 5,301,567 A | | 4/1994 | Snell et al. | |
| 5,361,646 A | * | 11/1994 | Venable ....................... | 74/493 |
| 5,377,555 A | | 1/1995 | Hancock | |
| 5,392,667 A | * | 2/1995 | Courvoisier .................. | 74/493 |
| 5,394,767 A | | 3/1995 | Hoblingre et al. | |
| 6,450,531 B1 | * | 9/2002 | Rinker et al. ................ | 280/775 |
| 2002/0084644 A1 | | 7/2002 | Rinker et al. | |

FOREIGN PATENT DOCUMENTS

GB        2352286 A       1/2001

OTHER PUBLICATIONS

European Search Report.

* cited by examiner

*Primary Examiner*—Thomas R. Hannon
*Assistant Examiner*—Colby Hansen
(74) *Attorney, Agent, or Firm*—Tarolli, Sundheim, Covell & Tummino L.L.P.

(57) ABSTRACT

A steering column (10) includes a support (24) through which a steering column member (12) extends connected with a mounting bracket (68). A locking mechanism (130) locks the support (24) in any one of a plurality of positions relative to the mounting bracket (68). The locking mechanism (130) has a locking shaft (200) extending through first and second cams (148, 132) and the mounting bracket (68). The first cam (148) is rotatable relative to the locking shaft (200) and the second cam (132) and has a first cam surface (150). The second cam (132) has a second cam surface (134) facing the first cam surface (150). A bearing (166) includes a flexible cage (168) and a plurality of bearing members (170) rotatable relative to the cage engaging the first and second cam surfaces (150, 134). The locking mechanism (130) clamps the support (24) to the mounting bracket (68) when the first cam (148) is in a first position relative to the second cam (132). The support (24) is movable relative to the mounting bracket (68) and the locking shaft (200) is prevented from moving relative to the mounting bracket when the first cam (148) is in a second position relative to the second cam (132).

11 Claims, 3 Drawing Sheets

STEERING COLUMN

FIELD OF THE INVENTION

The present invention relates to an adjustable steering column, and more specifically, to a locking mechanism for an adjustable steering column.

BACKGROUND OF THE INVENTION

A known steering column is disclosed in U.S. Pat. No. 5,394,767. U.S. Pat. No. 5,394,767 discloses an adjustable steering column having a locking mechanism. The locking mechanism includes a locking shaft with a stop member on one end of the locking shaft. The locking shaft extends through a bearing member engaging a mounting bracket. A spacing assembly is arranged between the stop member and the bearing member. The spacing assembly includes a rolling member engaging facing surfaces of the stop member and the bearing member. A lever is connected to a cage for displacing the rolling members along the facing surfaces of the stop member and the bearing member. The locking mechanism clamps the steering column in position when the lever is in a first position relative to the stop member and the bearing member. The locking shaft and steering column are movable relative to a mounting bracket when the lever is in a second position relative to the stop member and the bearing member.

SUMMARY OF THE INVENTION

A steering column of the present invention includes a steering column member connectable with a steering wheel and rotatable to turn steerable vehicle wheels. A mounting bracket connects the steering column to a vehicle frame. A support through which the steering column member extends is connected with the mounting bracket. The support supports the steering column member for rotation about a longitudinal axis of the steering column member and is movable relative to the mounting bracket.

A locking mechanism locks the support in any one of a plurality of positions relative to the mounting bracket. The locking mechanism has a locking shaft extending through first and second cams and the mounting bracket. The first cam is rotatable relative to the locking shaft and the second cam and has a first cam surface. The second cam has a second cam surface facing the first cam surface. A bearing located between the first and second cams includes a flexible cage and a plurality of bearing members rotatable relative to the cage. The bearing members engage the first and second cam surfaces. The locking mechanism clamps the support to the mounting bracket when the first cam is in a first position relative to the second cam. The support is movable relative to the mounting bracket and the locking shaft is prevented from moving relative to the mounting bracket when the first cam is in a second position relative to the second cam.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF THE INVENTION

Figure 1:
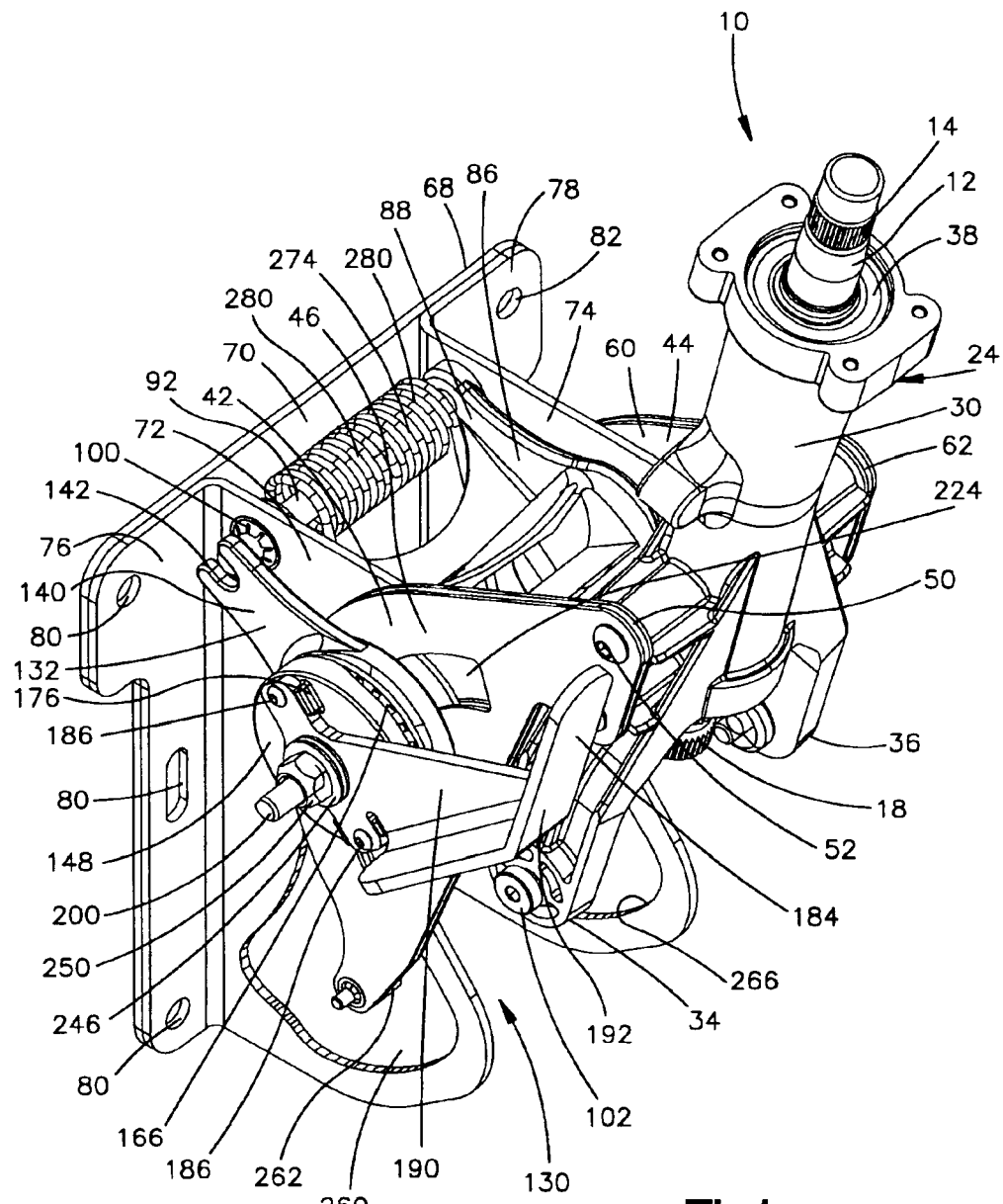
FIG. 1 is a schematic pictorial view of a steering column constructed in accordance with the present invention.
Figure 2:
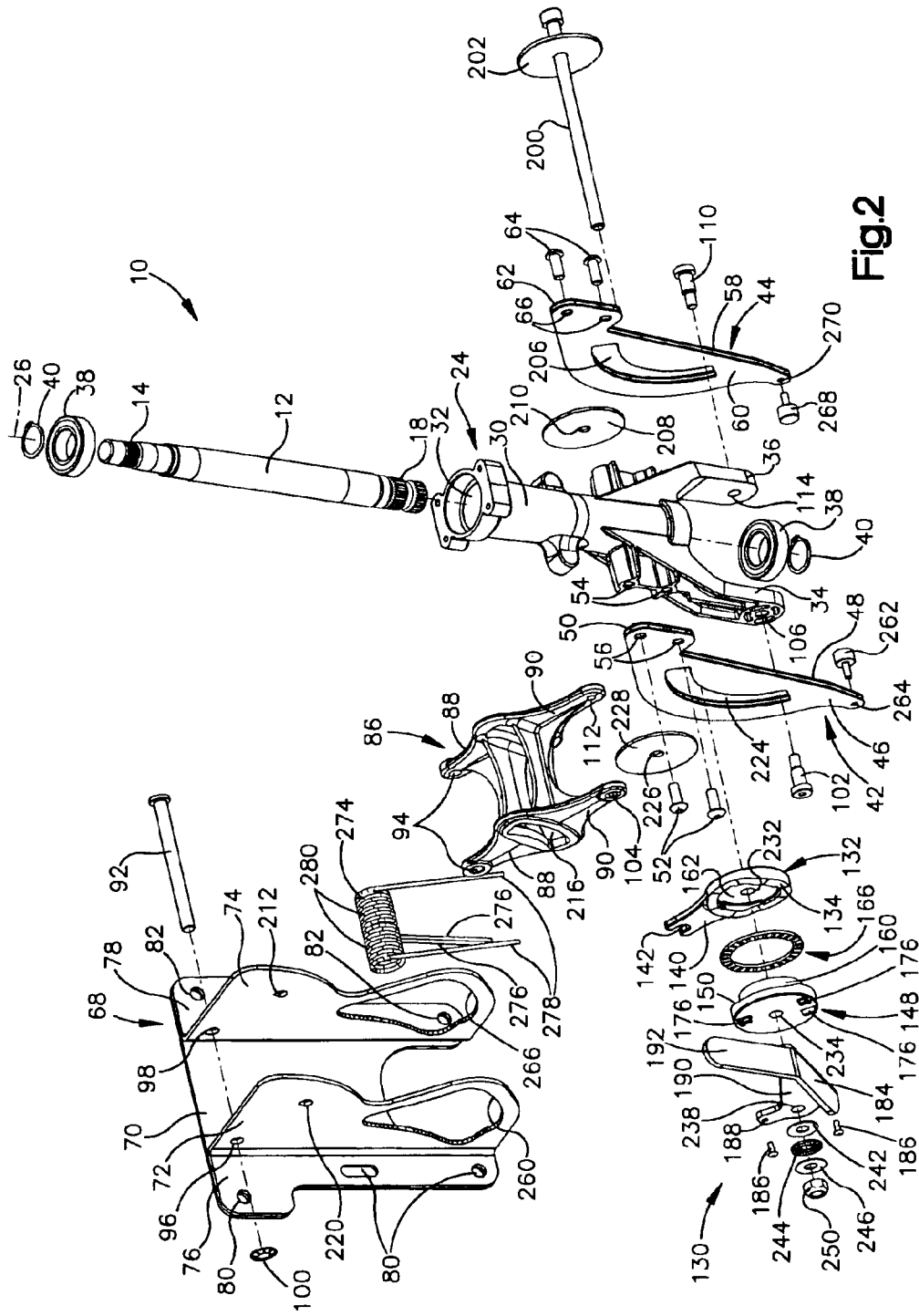
FIG. 2 is an exploded view of the steering column of FIG. 1.

A vehicle steering column 10 is illustrated in FIGS. 1 and 2. The steering column 10 includes a rotatable steering column member 12 to turn steerable vehicle wheels (not shown). The steering column member 12 has an end 14 connectable with a steering wheel (not shown) in any suitable manner. An end 18 of the steering column member 12 opposite from the end 14 is connectable with a universal joint (not shown). The universal joint connected with the end 18 of the steering column member 12 is connectable with a mechanism designed to transmit movement of the steering column member to a steering gear and permit movement of the steering column member relative to the mechanism, as known in the art.

A support 24 (FIGS. 1 and 2) supports the steering column member 12 for rotation about a longitudinal axis 26 of the steering column member. Upon rotation of the steering wheel, the steering column member 12 rotates about the longitudinal axis 26. Upon rotation of the steering column member 12 about the longitudinal axis 26, steerable vehicle wheels (not shown) are turned, as known in the art.

The support 24 (FIG. 2) has a tubular portion 30 with a passage 32 through which the steering column member 12 extends. Arm portions 34 and 36 extend from the tubular portion 30. The tubular portion 30 is made by casting and may have any desired shape. Bearings 38 axially located in the passage 32 support the steering column member 12 for rotation relative to the support 24. The bearings 38 are retained in the tubular portion 30 by snap rings 40.

The support 24 includes locking portions 42 and 44 extending axially from opposite sides of the tubular portion 30. The locking portion 42 includes plates 46 and 48 fixedly connected to each other with a spacer 50 between them. The locking portion 42 is fixedly connected to the tubular portion 30 by fasteners 52, such as screws. The fasteners 52 threadably engage openings 54 in the tubular portion 30 and extend through openings 56 in the plates 46 and 48 and through openings in the spacer 50.

The locking portion 44 is identical to locking portion 42 and therefore, will not be described in detail. The locking portion 44 includes plates 58 and 60 fixedly connected to each other with a spacer 62 between them. The locking portion 44 is fixedly connected to the tubular portion 30 by fasteners 64, such as screws. The fasteners 64 threadably engage openings in the tubular portion 30 and extend through openings 66 in the plates 58 and 60 and through openings in the spacer 62.

A mounting bracket 68 (FIGS. 1 and 2) connects the steering column 10 with a vehicle frame. The mounting bracket 68 includes a rear wall 70. Side walls 72 and 74 are connected to the rear wall 70. The side wall 72 includes a flange 76 extending parallel to and engaging the rear wall 70. The side wall 74 includes a flange 78 extending parallel to and engaging the rear wall 70. The side walls 72 and 74 extend generally perpendicular to the rear wall 70 and parallel to each other. The mounting bracket 68 is connected to the vehicle frame by fasteners (not shown), such as bolts, extending through openings 80 in the flange 76 of the side wall 72 and through openings in the rear wall 70. The mounting bracket 68 is also connected to the vehicle frame using fasteners (not shown), such as bolts, extending through openings 82 in the flange 78 of the side wall 74 and through openings in the rear wall 70.

A pivot member 86 (FIG. 2) interconnects the support 24 and the mounting bracket 68. The member 86 is generally H-shaped, as seen in FIG. 2. The pivot member 86 has a pair of arms 88 extending from one side of the pivot member toward the rear wall 70. The arms 88 are pivotally connected to the side walls 72 and 74. A pair of arms 90 extending from an opposite side of the pivot member 86 away from the rear wall 70 are pivotally connected with the support 24.

A pivot shaft 92 extends through openings 94 in the arms 88 of the pivot member 86. The shaft 92 is received in an opening 96 in the side wall 72 and extends through an opening 98 in the side wall 74 to pivotally connect the pivot member 86 to the mounting bracket 68. A retaining member 100 holds the pivot shaft 92 in the side walls 72 and 74. Accordingly, the pivot member 86 can pivot relative to the mounting bracket 68.

A pin 102 (FIG. 2) pivotally connects one of the arms 90 of the pivot member 86 to the support 24. The pin 102 extends through an opening 104 in the arm 90 and into an opening 106 in the arm portion 34 of the support 24. A pin 110 pivotally connects the other arm 90 of the pivot member 86 with the arm portion 36 of the support 24. The pin 110 extends through an opening 112 in the other arm 90 and into an opening 114 in the arm portion 36 of the support 24. Accordingly, the support 24 can pivot relative to the pivot member 86.

A locking mechanism 130 (FIGS. 1 and 2) locks the pivot member 86 in any one of a plurality of pivot positions relative to the mounting bracket 68. The locking mechanism 130 also locks the support 24 in any one of a plurality of pivot positions relative to the pivot member 86. The locking mechanism 130 applies a force to clamp the side wall 72 between the pivot member 86 and the locking portion 42 of the support 24. The locking mechanism 130 also clamps the side wall 74 between the pivot member 86 and the locking portion 44 of the support 24.

The locking mechanism 130 includes a cam 132 engaging the locking portion 42 of the support 24. The cam 132 (FIGS. 2 and 3) has a cam surface 134 facing away from the locking portion 42. The cam surface 134 (FIG. 3) has high portions 136 and low portions 138. The high portions 136 extend away from the locking portion 42 a greater distance than the low portions 138. The cam 132 also includes a radially extending arm 140 with a recess 142. The pivot shaft 92 (FIGS. 1 and 2) extends into the recess 142 in the cam 132 to prevent rotation of the cam 132 relative to the mounting bracket 68.

Figure 3:
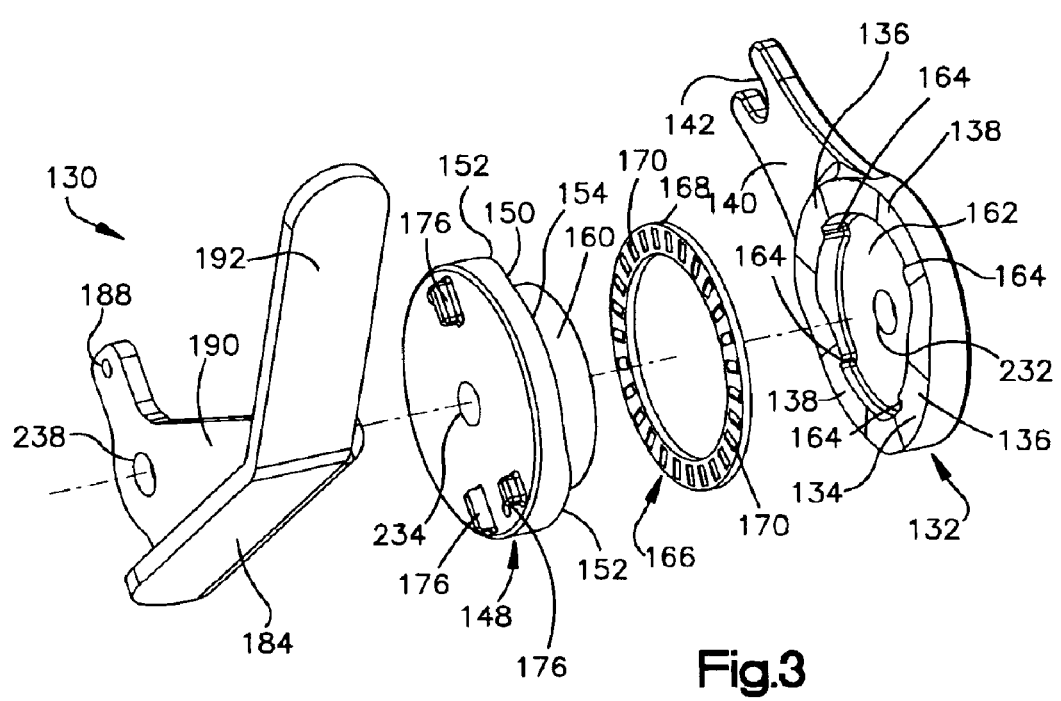
FIG. 3 is an enlarged exploded view of a portion of a locking mechanism of the steering column of FIG. 1.

The locking mechanism 130 (FIG. 3) includes a cam 148 rotatable relative to the cam 132. The cam 148 has a cam surface 150 facing the cam surface 134 on the cam 132. The cam surface 150 has high portions 152 and low portions 154, one of which is shown in FIG. 3. The high portions 150 extend toward the cam 132 a greater distance than the low portions 154. A cylindrical boss 160 extends from the cam 148 toward the cam 132. The boss 160 extends into a recess 162 in the cam 132. The cam 132 has a plurality of stop surfaces 164 defining the recess 162. Although four stop surfaces 164 are shown in FIG. 3, it is contemplated that the cam 132 could have any number of stop surfaces. The cam 148 has portions (not shown) that engage the stop surfaces 164 to define limits of relative rotation between the cams 132 and 148.

The boss 160 extending from the cam 148 supports a bearing 166 for rotation relative to the cams 132 and 148. The bearing 166 includes a flexible cage 168 and a plurality of bearing members 170 rotatable relative to the cage. The bearing members 170 engage the cam surfaces 134 and 150 on the cams 132 and 148. It is contemplated that the bearing members 170 could be needle bearings or ball thrust bearings.

The cam 148 (FIGS. 2 and 3) includes projections 176 extending away from the cam 132. An actuator 184 engages the projections 176 for manually applying a force to rotate the cam 148 relative to the cam 132. The actuator 184 (FIG. 2) is connected to the cam 148 by screws 186. The screws 186 extend through openings 188, one of which is shown in FIGS. 2 and 3, in a base portion 190 of the actuator 184 to connect the actuator to the cam 148. The actuator 184 has a manually engageable portion 192 extending from the base portion 190. A force is manually applied to the portion 192 to rotate the actuator 184 and cam 148 relative to the cam 132. Although a manually engageable actuator 184 for rotating the cam 148 relative to the cam 132 is shown, it is contemplated that any mechanism may be used to rotate the cam 148 relative to the cam 132.

A locking shaft 200 (FIG. 2) having a D-shaped cross section extends through a washer 202 engaging the locking portion 44. The locking shaft 200 also extends through a C-shaped slot 206 in the locking portion 44 and a washer 208 between the plates 58 and 60 of the locking portion 44. The washer 208 has a D-shaped opening 210 through which the locking shaft 200 extends to prevent rotation of the washer 208 relative to the locking shaft. The locking shaft 200 also extends through a D-shaped opening 212 in the side wall 74 of the mounting bracket 68 to prevent movement of the locking shaft relative to the mounting bracket. The pivot member 86 has a slot 216 through which the locking shaft 200 extends to permit movement of the pivot member relative to the locking shaft. The locking shaft 200 extends through a D-shaped opening 220 in the side wall 72 to further prevent movement of the locking shaft relative to the mounting bracket 68. The locking shaft 200 also extends through a C-shaped slot 224 in the locking portion 42 of the support 24 and a D-shaped opening 226 in a washer 228 extending between the plates 46 and 48 of the locking portion 42.

The locking shaft 200 extends through an opening 232 in the cam 132, the bearing 166, and an opening 234 in the cam 148 so that the cam 148 is rotatable relative to the locking shaft. The locking shaft 200 extends through an opening 238 in the base portion 190 of the actuator 184. The locking shaft 200 also extends through a washer 242 engaging the base portion 190 of the actuator 184, a thrust bearing 244 engaging the washer 242, and a washer 246 engaging the thrust bearing 244. A nut 250 is threaded onto the locking shaft 200 and engages the washer 246.

The actuator 184 is manually engageable to rotate the actuator and the cam 148 about the locking shaft 200 and relative to the cam 132. When the cam 148 is in a first position relative to the cam 132, the high portions 152 on the cam 148 are aligned with the high portions 136 on the cam 132 and the locking mechanism 130 clamps the support 24 to the mounting bracket 68. When the cam 148 is rotated by the actuator 184 relative to the cam 132 to a second position in which the low portions 150 on the cam 148 are aligned with the high portions 136 on the cam 132, the support 24 is movable relative to the mounting bracket 68. When the support 24 moves relative to the mounting bracket 68, the locking shaft 200 is prevented from moving relative to the mounting bracket by the openings 220 and 212 in the mounting bracket.

The side wall 72 (FIG. 2) of the mounting bracket 68 has a pear-shaped opening 260 into which a pin 262 connected with the support 24 extends. The pin 262 extends through openings 264 in the locking portion 42 of the support 24. The side wall 74 has a pear-shaped opening 266 into which a pin 268 connected with the support 24 extends. The pin 268 extends through openings 270 in the locking portion 44 of the support 24. The pins 262 and 268 engage surfaces defining the openings 260 and 266 to define the limits of movement of the support 24 relative to the mounting bracket 68. The openings 260 and 266 have a generally pear-shaped configuration, however, the openings 260 and 266 may have any desired shape.

A spring member 274 urges the support 34 toward an out of the way position relative to the mounting bracket 68. The spring member 274 has end portions 276 that engage the rear wall 70 of the mounting bracket 68. The spring member 274 has opposite end portions 278 that engage the arm portions 34 and 36 of the support 24 to urge the support member 24 toward the out of the way position. The pivot shaft 92 extends through coil portions 280 of the spring member 274 to connect the spring member to the mounting bracket 68.

The support 24 is prevented from moving relative to the mounting bracket 68 when the cam 148 is in the first position relative to the cam 132. The support 24 can be moved relative to the mounting bracket 68 when the cam 148 is rotated about the locking shaft 200 relative to the cam 132 from the first position to the second position. After the support 24 is moved to a desired position, the cam 148 is rotated relative to the cam 132 from the second position to the first position to prevent the support from moving from the desired position. It is contemplated that any mechanism could be used to rotate the cam 148 relative to the cam 132 from the second position to the first position.

From the above description of the invention, those skilled in the art will perceive improvements, changes and modifications. Such improvements, changes and modifications within the skill of the art are intended to be covered by the appended claims.

Having described the invention, the following is claimed:

1. A steering column comprising:
    a steering column member;
    a mounting bracket;
    a support connected with said mounting bracket and through which said steering column member extends, said support supporting said steering column member for rotation about a longitudinal axis of said steering column member and being movable relative to said mounting bracket;
    a locking mechanism which locks said support in any one of a plurality of positions relative to said mounting bracket, said locking mechanism having a locking shaft extending through first and second cams and said mounting bracket, said first cam being rotatable relative to said locking shaft and said second cam and having a first cam surface, said second cam having a second cam surface facing said first cam surface, a bearing located between said first and second cams and engaging said first and second cam surfaces, said locking mechanism clamping said support to said mounting bracket when said first cam is in a first position relative to said second cam, said support being movable relative to said mounting bracket and said locking shaft being prevented from rotating relative to said mounting bracket when said first cam is in a second position relative to said second cam; and
    a member pivotally connected to said mounting bracket, said support being pivotally connected to said member, said locking mechanism preventing pivotal movement of said member relative to said mounting bracket and pivotal movement of said support relative to said member when said first cam is in said first position relative to said second cam, said locking shaft extending through said member and said support.

2. A steering column as defined in claim 1 wherein said bearing is rotatable relative to said first and second cams.

3. A steering column as defined in claim 1 wherein said bearing includes a flexible cage and a plurality of bearing members rotatable relative to said cage, said bearing members engaging said first and second cam surfaces.

4. A steering column as defined in claim 3 wherein said plurality of bearing members are one of needle bearings and ball thrust bearings.

5. A steering column as defined in claim 1 further including an actuator connected with said first cam, said actuator rotating said first cam relative to said second cam upon application of a force to said actuator to rotate said actuator.

6. A steering column as defined in claim 1 wherein said first cam is engageable with said second cam to limit rotation of said first cam relative to said second cam.

7. A steering column comprising:
    a steering column member;
    a mounting bracket;
    a support connected with said mounting bracket and through which said steering column member extends, said support supporting said steering column member for rotation about a longitudinal axis of said steering column member and being movable relative to said mounting bracket;
    a locking mechanism which locks said support in any one of a plurality of positions relative to said mounting bracket, said locking mechanism having first and second cams, said first cam being rotatable relative to said second cam and having a first cam surface, said second cam having a second cam surface facing said first cam surface, a bearing located between said first and second cams and engaging said first and second cam surfaces, said bearing including a flexible cage and a plurality of bearing members rotatable relative to said cage, said bearing members engaging said first and second cam surfaces, said locking mechanism clamping said support to said mounting bracket when said first cam is in a first position relative to said second cam, said support being movable relative to said mounting bracket when said first cam is in a second position relative to said second cam;
    a member pivotally connected to said mounting bracket, said support being pivotally connected to said member, said locking mechanism preventing pivotal movement of said member relative to said mounting bracket and pivotal movement of said support relative to said member when said first cam is in said first position relative to said second cam; and
    a locking shaft extending through said first and second cams, said mounting bracket, said member, and said support, said first cam being rotatable about said locking shaft relative to said second cam.

8. A steering column as defined in claim 7 wherein said bearing is rotatable relative to said first and second cams.

9. A steering column as defined in claim 7 wherein said plurality of bearing members are one of needle bearings and ball thrust bearings.

10. A steering column as defined in claim 7 further including an actuator connected with said first cam, said actuator rotating said first cam relative to said second cam upon application of a force to said actuator to rotate said actuator.

11. A steering column as defined in claim 7 wherein said first cam is engageable with said second cam to limit rotation of said first cam relative to said second cam.

* * * * *